(12) United States Patent
Jonas et al.

(10) Patent No.: US 6,350,710 B1
(45) Date of Patent: Feb. 26, 2002

(54) ABSORBENT INSERTS, METHOD OF PRODUCING THEM AND THEIR USE

(75) Inventors: Gerd Jonas, Kempen; Helmut Klimmek, Krefeld; Frank Krause, Kleve; Klaus Pflüger, Krefeld, all of (DE)

(73) Assignee: Stockhausen GmbH & Co. KG, Krefeld (DE)

( * ) Notice: Subject to any disclaimer, the term of this patent is extended or adjusted under 35 U.S.C. 154(b) by 0 days.

(21) Appl. No.: 09/147,476

(22) PCT Filed: Jun. 27, 1997

(86) PCT No.: PCT/EP97/03380

§ 371 Date: Feb. 25, 1999

§ 102(e) Date: Feb. 25, 1999

(87) PCT Pub. No.: WO98/01299

PCT Pub. Date: Jan. 15, 1998

(30) Foreign Application Priority Data

Jul. 6, 1996 (DE) .......................... 196 27 409
Nov. 2, 1996 (DE) .......................... 196 45 240

(51) Int. Cl.⁷ .......................... B32B 5/16; A61F 13/15; F25D 3/08
(52) U.S. Cl. .................. 442/118; 442/123; 442/385; 442/393; 62/529; 62/530; 426/124; 604/367; 604/378; 428/74
(58) Field of Search ................ 442/118, 123, 442/385, 393; 383/901; 607/114; 62/529, 530; 426/106, 124, 129; 206/205; 428/74; 604/358, 367, 378

(56) References Cited

U.S. PATENT DOCUMENTS

| | | | |
|---|---|---|---|
| 4,076,663 A | 2/1978 | Masuda et al. | |
| 4,286,082 A | 8/1981 | Tsubakimoto et al. | |
| 4,321,997 A | 3/1982 | Miller | |
| 4,340,706 A | 7/1982 | Obayashi et al. | |
| 4,449,977 A | 5/1984 | Korpman | |
| 4,548,847 A | 10/1985 | Aberson et al. | |
| 4,677,174 A | 6/1987 | Alexander et al. | |
| RE32,649 E | * 4/1988 | Brandt et al. ............ 604/368 |
| 5,031,418 A | * 7/1991 | Hirayama et al. ............ 62/530 |
| 5,055,332 A | * 10/1991 | Rhodes et al. ............ 428/74 |
| 5,447,531 A | * 9/1995 | Wood ............ 607/108 |
| 5,629,377 A | * 5/1997 | Burgert et al. ............ 524/832 |
| 5,672,633 A | * 9/1997 | Brehm et al. ............ 521/53 |
| 5,709,089 A | * 1/1998 | Dawson et al. ............ 62/4 |
| 5,709,897 A | * 1/1998 | Pearlstein ............ 426/106 |
| 5,712,316 A | * 1/1998 | Dahmen et al. ............ 521/72 |
| 5,837,789 A | * 11/1998 | Stockhausen et al. ............ 526/320 |

FOREIGN PATENT DOCUMENTS

| | | |
|---|---|---|
| DE | 26 50 377 | 5/1977 |
| DE | 27 06 135 | 8/1978 |
| DE | 28 40 010 | 6/1979 |
| DE | 30 34 169 | 4/1982 |
| DE | 30 34 170 | 4/1982 |
| DE | 35 03 458 | 8/1985 |
| DE | 37 10 574 | 10/1988 |
| DE | 37 13 601 | 11/1988 |
| DE | 40 20 780 | 8/1991 |
| DE | 87 18 000 | 7/1992 |
| DE | 41 20 319 | 12/1992 |
| DE | 42 34 632 | 4/1994 |
| DE | 43 23 001 | 5/1994 |
| DE | 42 44 548 | 7/1994 |
| DE | 44 18 818 | 1/1995 |
| DE | 43 25 879 | 2/1995 |
| DE | 43 33 056 | 3/1995 |
| DE | 44 18 319 | 11/1995 |
| DE | 195 05 708 | 8/1996 |
| EP | 0 297 069 | * 6/1988 |
| EP | 0 320 314 | 6/1989 |
| EP | 0 353 334 | * 2/1990 |
| EP | 0 395 223 | 10/1990 |
| EP | 0 434 733 | 7/1991 |
| EP | 0 443 627 | * 8/1991 |
| EP | 0 302 504 | * 4/1993 |
| EP | 0 562 846 | 9/1993 |
| EP | 0 568 033 | 11/1993 |
| WO | 92/02679 | * 2/1992 |
| WO | 93/21237 | * 10/1993 |

\* cited by examiner

Primary Examiner—Terrel Morris
Assistant Examiner—Jenna-Leigh Befumo
(74) Attorney, Agent, or Firm—Oblon, Spivak, McClelland, Maier & Neustadt, P.C.

(57) ABSTRACT

The invention relates to an absorbent insert for foodstuff packagings, the liquid-absorbing component of which is a superabsorbent polymer which, in a hitherto unrivaled fashion, persistently absorbs and retains large quantities of liquid even under high pressure load, protects the foodstuffs from bacterial decay, and prevents contamination of the packaging goods by migrating soluble constituents of the polymer. This combination of properties of the superabsorbers used is expressed by the $Q_{SAP\ 0.3}$ quotient of retention according to the tea bag test+absorption against pressure (AAP) 0.3, divided by the amount of solubles (LA), which quotient is at least 20. Superabsorbers having such properties are obtained by using special combinations of crosslinkers. Furthermore, the invention relates to a process for producing said absorbent inserts and their use in foodstuff packagings, as ice substitute, and as leak-proofing means in transport packagings.

22 Claims, No Drawings

ABSORBENT INSERTS, METHOD OF PRODUCING THEM AND THEIR USE

The invention relates to a new and improved absorbent insert for foodstuff packagings, especially for meat, poultry and fish. It consists of a flat pouch made of a water-permeable film and has a filling which at least in part is composed of a superabsorbent polymer having high gel stability, high retention and a low ratio of solubles. The insert is remarkable for its rapid and sustained absorption of liquid exuding from the foodstuff, and it extends the preserving period by effectively preventing microbial growth. In addition, the inserts soaked with water, when they are in the frozen state, are excellently suited as an ice substitute for refrigerating foodstuffs.

Foodstuffs are frequently presented in a prepacked form on the market. Such packagings consist predominantly of flat trays, wherein the foodstuff is covered externally by air-, water- and odorproof films. As a result, neither the aqueous constituents present in the foodstuffs nor those adhering due to previous washing can escape from the packagings. An optically quite impressive sight is the accumulation of liquid at the contact surface between the film and red meat. On the one hand, this makes the packaged foodstuffs appear unappetizing as a consequence and, because of the ingredients exuding from the foodstuffs together with the liquids, gives rise to microbial growth affecting the preserving period and, in addition, is a source of microbial infections. The high contamination of poultry with bacteria of the Salmonella class is generally familiar.

To overcome these problems, absorbent substrates for packaged foodstuffs have been developed, which are predominantly composed of multiple layers of cellulose. In practice, however, it was found that these substrates do not meet the requirements with respect to absorptive capacity and retention capability under the weight of foodstuffs resting on them.

Thus, for example, a normally six-ply layer of cellulose wadding with the dimensions 7×10 cm is capable of absorbing only about from 8 to 10 g of liquid at maximum. Now, when a piece of meat is packed in a packaging tray and kept for sale in a refrigerated display case, up to 10% of the net weight may be released as meat juice and hence, up to 50 g in the case of a 500 g piece of meat. Such a quantity surpasses by far the absorptive capacity of the absorbent layer made of cellulose fleece. As a result, there is bacterial growth on these moist, non-sterile substrates, impairing the keeping quality of the foodstuff.

Therefore, a number of efforts have been made to develop packaging systems in order to remove the liquid exuded by foodstuff from that foodstuff by absorption, so that no nutrients would be available for bacterial growth.

DE 3,034,170 C2 describes a water-adsorbing insert for foodstuff packagings, especially for meat, poultry, fish, and sausages, which contains a mixture of diatomaceous earth and aerosil in a flat pouch made of a water-permeable film. Because the inorganic filling material merely adsorbs the liquid, its absorptive capacity is low, i.e., uneconomically high amounts of adsorbent are required for sufficient liquid binding, thereby undesirably increasing the weight of the packaging. Another drawback of the inorganic adsorbers is their incapability of retaining the adsorbed liquid over a long time or under pressure load.

DE 3,034,169 C2 suggests mixtures of diatomaceous earth and an organic gel-forming agent as filling material for water-adsorbing inserts of foodstuff packagings, wherein carboxymethylcellulose, cellulose ethers, polyvinylpyrrolidone, starch, dextrose, gelatin and/or pectins are mentioned. The ratio of organic gel-forming agents is reported to be around 20 wt.-%. As a result of the high ratio of solubles and the extremely slow swelling rate of the above-mentioned compounds, the use of such adsorbing inserts for foodstuff must be regarded as critical. Solubles of the organic gel-forming agents reduce the swelling capacity thereof and may migrate out of the insert and contact the foodstuffs; slow swelling rates obstruct effective absorption of the liquid in the packaging, so that leaking of accumulated liquid may occur.

EP 302,504 B1 suggests an absorbent pad which may be arranged in a packaging under foodstuff tending to exude liquid, e.g., meat, poultry and the like. The absorbent pad is constituted of a mat of a liquid-absorbing wood flake material enveloped by paper. The paper-enveloped absorbent pad in turn is enveloped by a liquid-impermeable material such as polyethylene which, however, has a multiplicity of perforations extending in longitudinal direction of the envelope. As a result of the relatively low absorptive capacity and the low bulk density of wood flakes, a practice-oriented absorption of liquid is obtained only with an uneconomically high packaging volume.

DE 4,325,879 C2 describes molded articles made of thermoplastic foams as packaging material for goods containing moisture, wherein the cell structure of the hydrophobic foam framework is partially open, thereby being capable of absorbing liquids which, however, cannot be bound tightly. In order to absorb polar solvents such as water, the hydrophobic foams must be modified in addition, using up to 10 wt.-% of a surfactant wetting agent. To prevent compressing of the foams under the weight of the food-stuffs, foams having higher density, i.e., higher stability, are required. However, the absorptive capacity of such thermoplastic foams is reduced with increasing foam density, i.e., with increasing stability of the foam.

To improve the absorptive capacity, superabsorbent polymers have been suggested as filling materials for absorbent pads. Compared to cellulose, they are capable of storing larger amounts of aqueous liquids.

DE 4,120,319 A1 and DE 4,234,632 A1, respectively, describe tray-shaped foodstuff packaging containers having integrated a liquid absorber system. To absorb liquid released by foodstuffs, polyacrylate polymers having a moisture absorption capacity ranging from 1 to 100 ml/g are preferably used; in particular, the alkali salts of starch-modified polyacrylates are preferably used. Other statements indicate that moisture is deposited on charged goods if there is direct contact between the absorber and the charged goods. Thus, it must be concluded that the absorbers used are not capable of binding liquid from the food-stuff sufficiently tightly or retaining same under pressure, and that solubles from the absorber may possibly be passed onto the foodstuff in case of direct contact. Because close contact of these absorbent polymers with the charged goods as well as pressure load on the swollen absorber must be avoided, an expensive construction of the packaging container in the form of an additional perforated bottom plate with supporting elements is required, separating the foodstuff from the absorber.

Absorbent substrates as supporting layers in and poultry meat packagings for collecting liquid exuded from these meat products are known from EP 434,733 B1. Inside the absorbent substrate confined externally by a partially perforated plastic film, there are layers of cellulose and thermoplastic fibers, wherein superabsorbent polymer grains of carboxymethylcellulose or acrylate absorbers are fixed, thereby improving the retention properties of the absorbent substrate, so that liquid already absorbed is not re-released even under pressure load. The superabsorbers do not have to meet specific requirements with respect to absorptive capacity, gel stability and solubles. To avoid migration in case of higher load on the absorbent pad, it is recommended not to perforate the upper film adjacent to the foodstuff and allow the liquid to enter at the lateral edges of the absorbent substrate, which are not completely sealed.

U.S. Pat. No. 4,449,977 describes a flexible absorbent product containing uniformly dispersed particles of a water-insoluble, water-swellable organic polymer in a water-insoluble, non-swellable matrix of a thermoplastic polymer, namely, a polyester. Preferably, the matrix is in the form of a film. The absorbent product is produced by co-extruding said mixture of water-insoluble matrix material (polyester) and water-insoluble but water-swellable organic polymer used as absorbent material. However, the absorbent material may also be applied onto the extruded matrix layer. The absorbent product may be used in a diaper, the matrix containing the absorbent material being covered on one side with a liquid-impermeable layer, and on the other side with a liquid-permeable layer. Such absorbent products are disadvantageous in that part of the absorber particles are prevented from swelling by the hydrophobic polyester matrix, and that the continuously extending polyester matrix forms a barrier type layer in the distribution of liquid to be absorbed. The suggested superabsorbent polymers, including crosslinked polyalkylene oxides, carboxymethylcellulose crosslinked with epichlorohydrin, partially saponified polyacrylamide prepared from acrylamide and N,N'-methylenebisacrylamide do not comply with the polymers admitted for foodstuff packagings and do not meet the requirements with respect to low solubles and gel stability under load.

EP 320,314 B1 describes water-absorbing, non-woven layers of partially surface-saponified polyacrylonitrile fibers optionally provided with top and bottom protective layers. As a result of the low water-absorbing capacity of these polyacrylonitrile fibers, being from 3 to 5 g/g, the high amounts of liquid occurring in many foodstuff packagings cannot be bound quantitatively. In addition, after initial swelling, the closely adjoining fibers in the outer region of the layer block further penetration of the aqueous liquid into the interior region, thus producing a considerable loss in capacity.

EP 395,223 A2 describes an absorbent pad for aqueous and organic liquids, consisting of a core of liquid-absorbing polymeric material, which core absorbs the liquid, and an insoluble and flexible envelope which, however, is permeable to the Liquid. The absorbent pad is used in the fields of hygiene products, transport and foodstuff packagings. The predominantly powdered absorbent polymeric materials on the basis of synthetic and/or natural polymers, including crosslinked polyacrylates, may also be dispersed on one or between two interior water-permeable fabric surfaces which in turn are enclosed by the exterior absorbent pad envelope. The exterior envelope is sufficiently flexible to allow an increase in volume caused by the swelling of the absorber polymer. The polymer powders to be used should have a particle distribution of between 20 and 100 mesh and a powerful absorption of from 50 to 600 g of saline solution or from 600 to 800 g of water/g of polymer, with a low ratio of solubles. There are no specific requirements with respect to the amount of solubles and the gel stabilities of the swollen absorbers. The preferred polymers are identical with those which also in EP 562,846 A1 cited hereinafter, are reported to be preferred.

EP 562,846 A1 describes a flat, light-weight pad having a filling of crosslinked superabsorbent polymers and a liquid-impermeable envelope which, from a specific expansion on, is capable of opening itself at a predetermined position, which pad may also be used in foodstuff packaging, among other things. The water-insoluble but water-swellable absorbers are slightly to moderately crosslinked, have low solubility and preferably, are polymerizates of acrylic acid or methacrylic acid or salts thereof. In a particularly good embodiment with respect to retention and absorption, an absorber is used which is copolymerized with styrene in accordance with U.S. Pat. No. 4,677,174. Claimed therein are polymers having from 0.001 to 0.3 wt.-%, relative to the monomers, of bisacrylamide and polyol acrylate type crosslinkers; in the embodiments, the crosslinker concentrations mostly are clearly below 0.1%. As to the solubles, there are no indications in U.S. Pat. No. 4,677,174 but, e.g., from WO 93/21237, page 17, Table 1, it is familiar to a person skilled in the art that using polyol acrylic ester type crosslinkers will result in soluble ratios of from 7.9 to 19.2%, the low value of 7.9% already requiring a crosslinker concentration of 0.9 wt.-% of monomers. However, this concentration exceeds by far the upper limit of 0.3 wt.-% recommended in U.S. Pat. No. 4,677,174. Consequently, while such low crosslinker concentrations do provide high absorption, this is achieved only with the disadvantage of very high soluble ratios and low gel stability. For absorbers to be used in foodstuff packagings, however, neither high solubles, nor low gel stabilities, nor toxicologically critical bisacrylamide type crosslinkers are suitable.

The essential problems in the construction/function of all these well-known packaging systems using liquid absorbers are exceedingly low absorptive capacity of the absorbent material, insufficient absorption rate and insufficient pressure resistance (gel strength) of the swollen absorber, respectively, and especially, exceedingly high solubles which may remigrate into the foodstuffs together with the liquids absorbed by the foodstuffs. Thus, for example, perforation of the absorbent pad film adjacent to the foodstuff is largely forsaken, in order to avoid contact with exuding liquid. Again and again, the result of this is that exudates may undesirably accumulate in hollows on the upper film adjacent to the foodstuff, thus contributing to early spoilage of the foodstuff.

Therefore, U.S. Pat. No. 4,321,997 suggests an expensive construction of an absorbent pad having interior spacers to prevent the absorbed liquid from being squeezed out of the absorbent insert. If used, the superabsorber is located on or in the fluffy ply of the absorbent pad. To avoid microbial growth, preservatives are added, which is generally critical in the field of foodstuff packaging.

The problem of high solubles is also present when using superabsorbent polymers in the hygienics field of application. Indeed the high absorption demanded there has been achieved together with sufficient gel stability, but it has also been recognized that ultimately, the solubles ratio was still exceedingly high. In particular, it has been recognized that solubles forming only after a long exposure time of the aqueous liquid on the absorber, impair the long-term absorptive capacity.

Therefore, U.S. Pat. No. Re. 32,649 describes a polymerization process under acidic pH conditions for the production of polyacrylate-based superabsorbent polymers low in solubles for sanitary use. However, the limits for solubles delineated therein, being 17 wt.-% at maximum, preferably 10 wt.-% at maximum after an extraction period of 16 hours, would still be exceedingly high for use in the field of foodstuff packaging.

Thus, the EC commission for the regulation of food-stuff packagings and other consumer goods designates the measurement of overall migration (global migration) with an admissible maximum value of 10 milligrams of migrated packaging component per square decimeter packaging surface or 60 milligrams per kilogram foodstuff as an important marker value. This limitation is intended to protect foodstuff from unacceptable alterations caused by the packaging. The council directive 90/128 EEC specifically regulates the contact of plastic materials and consumer goods with foodstuffs.

The above-mentioned limits are determined according to directive 85/572/EEC, using so-called simulants comprising distilled water, 3% acetic acid in aqueous solution, 15% ethanol in aqueous solution and rectified olive oil. Therein, for example, distilled water is used as a simulant for fish, meat and vegetables. The directive 82/711/EEC for determining the migration from materials for foodstuff packagings prescribes a test period of 10 days for a contact time of >24 hours.

With respect to meat and fish, it should also be noted for the simulant that these foodstuffs exude saline aqueous solutions corresponding to a physiological solution, i.e., a 0.9 wt.-% saline solution. Frequently, the washing water adhering to the foodstuff is also to be considered. In an extreme case, the mixture of washing water/exudate may correspond to a saline solution of about 0.2 wt.-%. However, because the absorptive behavior of the superabsorbent polymers is crucially determined by the salt content of the aqueous liquid, migration tests using these saline liquids are indispensable for assessing the inserts.

It is therefore the object of the present invention to provide inserts for foodstuff packagings, which contain new, superabsorbent polymers and do not have the apparent drawbacks of prior art illustrated above. In particular, it is necessary to provide absorbers for said inserts which, under the pressure of foodstuffs resting on them, have high absorptive capacity and retention for exudates from these foodstuffs and, in contrast to prior art findings, have only minor amounts of solubles despite the high absorption under pressure. The inserts produced therefrom are intended to absorb the exudates from foodstuffs rapidly and persistently, have low weight and volume compared to the absorbed liquid as well as negligibly low migration values, show sufficient protection against bacterial growth and prevent odor production when storing the foodstuffs.

According to the invention, said object is attained by means of absorbent substrates produced using crosslinked polymerizates which absorb aqueous liquids and are built up of partially neutralized monomers bearing ethylenically mono-unsaturated acid groups, optionally other monomers copolymerizable therewith, and optionally polymers suitable as basis for grafting, characterized in that the quotient of the absorption values, i.e., of retention (TB=tea bag test, for description see below) and absorption against pressure (AAP) at 0.3 psi (21 g/cm², for description see below) and the amount of solubles (LA) of the absorbent crosslinked polymers contained in the insert, $$Q_{SAP\,0.3} = \frac{\text{Retention }(TB) + \text{Absorption against pressure }(AAP) \text{ at 0.3 psi}}{\text{Solubles }(LA)}$$

is at least 20, preferably at least 30, and particularly preferred, at least 40.

It was found for the absorbent substrates according to the invention that the quotient of the absorption values and the solubles ratio is of crucial significance for the functional capability of the substrate. The higher this quotient is adjusted by means of the crosslinkers used according to the invention, the better the capability of the absorbent substrate of persistently absorbing large amounts of exudate even at high pressure load, of protecting the foodstuffs from bacterial infestation and preventing contamination of the foodstuffs by re-migrated exudates or migrated material from the absorbent substrate. Using the absorbent substrates of the invention, it is also possible to stack multiple packaging units on top of the other, with no absorbed liquid being pressed out of the insert in the bottom packaging.

In another preferred embodiment of the invention, superabsorbent polymers are used which also in case of AAP 0.7 ($Q_{SAP\,0.7}$) comply with the quotient required according to the invention. Absorbent substrates filled with such absorbers are particularly suited for the aforementioned applications under high foodstuff load.

The absorbers used according to the invention have a retention (TB) of at least 22 g/g, preferably at least 25 g/g, and particularly preferred, of at least 28 g/g, and an absorption against pressure (AAP 0.3) of at least 15 g/g, preferably at least 20 g/g, with at least 22 g/g being particularly preferred; the solubles ratio (LA) is 3.5 wt.-% at maximum, preferably 2.5 wt.-% at maximum, and particularly preferred, 1.5 wt.-% at maximum.

The inserts produced using the superabsorbent polymers of the invention have low migration values of below 15 mg/g, preferably below 10 mg/g and particularly preferred, below 5 mg/g absorbent insert, and protect the foodstuffs from bacterial infestation.

The absorbent insert of the invention consists of an absorbent core and an envelope. The absorbent core contains the superabsorbent polymer particles of the invention, optionally enclosed by fibers or fabric, the polymer particles optionally being embedded or fixed in the fibers or fabric. A layered arrangement of the superabsorbent particles inside the absorbent core of fibers or fabric was found to be advantageous, where it is frequently advantageous to use absorbers in the layered arrangement which have different particle sizes and/or different absorptive capacities, in order to obtain optimum absorption and long-term storage of the exudates.

Preferably, the fibers used have a length/diameter ratio of more than or equal to 50. As fiber material, absorbent or non-absorbent natural or synthetic, crimped or non-crimped staple fibers may be used. Suitable fibers include cellulose fibers (cotton, wood, among others), regenerated fibers (viscose, rayon, among others), and synthetic fibers (including polyolefins, polyacrylates, polyamides, polyesters, polystyrene). Staple fibers of polypropylene (PP), polyethylene (PE) and polyethylene terephthalate (PET) are particularly preferred.

In another preferred embodiment, fibers in the form of hollow fibers are used, which are capable of storing and/or conveying liquids in their cavities.

The fineness of the fibers to be used according to the invention preferably ranges from 0.005 to 3 den (from 0.006 to 3.3 dtex), and the length may vary between 0.1 and 15 cm, preferably between 0.5 and 7.0 cm.

The fibrous fabrics to be used according to the invention may be produced using all the well-known methods. By way of example, carded needled nonwovens, thermally or latex-fixed nonwovens and meltblown nonwovens may be mentioned.

The fiber content of the insert preferably ranges from 30 to 300 g/m², particularly preferred, between 40 and 100 g/m².

Fibrous fabrics are capable of absorbing liquids exuded from the foodstuffs, where both an absorption by the fibrous material and an absorptive effect with intercalation into the space between the fibers may take effect.

The features of the superabsorbers to be used according to the invention are not bound to specific polymeric structures or production processes. In principle, all the superabsorbers on synthetic or natural basis may be used, which meet the requirements with respect to the quotient (TB+AAP 0.3)/LA and thus, impart sufficient functionality to the absorbent substrates according to the invention. On the one hand, said functionality lies in their ability to absorb the exudates completely, even under pressure, and to prevent back-flow into the foodstuff as effectively as possible, and on the other hand, reduce migration from the absorbent substrate to an acceptable minimum in cases of undesired excessive amounts of liquid.

The polymerizate absorbing aqueous liquids to be used according to the invention may be obtained by polymerization of ethylenically unsaturated monomers bearing acid groups, e.g., acrylic acid, methacrylic acid, vinylacetic acid, maleic acid, 2-acrylamido-2-methylpropanesulfonic acid, vinylsulfonic acid, (meth)allylsulfonic acid and/or mixtures thereof, in the presence of crosslinkers.

To modify the properties, the polymerizates of the invention may optionally contain other comonomers largely soluble in the aqueous monomer solution, if not opposed by food law regulations. Such comonomers common in the production of synthetic superabsorbers may be non-ionic, anionic or cationic as well; for example, vinylpyrrolidone, vinylacetamide, hydrox-yethyl acrylate, alkylaminoalkyl (meth)acrylate may be mentioned. Likewise, mixtures of these comonomers may be employed. The ratio of these comonomers should not exceed 40 wt.-%, because they might impair the swellability of the superabsorbers.

The ratio of acidic monomers in the monomer mixture is 55–99 wt.-%.

Surprisingly, it was found that a specific combination of crosslinker mixtures, degree of neutralization and batch concentration results in the formation of superabsorbers which have a level of properties with respect to high retention, high absorption against pressure, rapid liquid absorption and extremely low solubles ratio, which has not been achieved to date and therefore, are excellently suited for use in absorbent substrates of foodstuff packagings for absorbing aqueous liquids. Of course, the superabsorbers to be used according to the invention are also excellently suited for use in the hygienics industry (diapers, liners, etc.) and in transport packagings.

As components of crosslinker mixtures, those of the types of di- and triallylamine (Group A crosslinkers), acrylate and methacrylate esters of polyol (Group B crosslinkers) are possible in an embodiment of the invention, especially esters of polyhydroxy compounds with unsaturated carboxylic acids, which are alkoxylated in a preferred embodiment. $C_{3-6}$ polyhydroxy compounds having 2–4 hydroxyl groups are preferred as starting compounds for the synthesis of such crosslinkers; for example, trimethylolpropane, glycerol, pentaerythritol, 1,3-propanediol, propylene glycol, or 1,4-butanediol. If the alcohol is alkoxylated prior to esterification, ethylene oxide is preferably used. Preferably, alkoxylated polyhydroxy compounds are employed, having attached at least 1 mole of ethylene oxide, preferably at least 3 moles of ethylene oxide per mole polyhydroxy compound. Other preferred crosslinkers are polyethylene glycol diacrylate or dimethacrylate, which contain polyethylene glycol residues having from 3 to 20 EO units. Likewise, acrylate or methacrylate esters of alkoxylated allyl or methallyl alcohol (Group C crosslinkers) were found to be excellently suited crosslinkers. Preferably, these crosslinkers contain at least three, more preferably from 5 to 20 ethylene oxide units between the unsaturated groups.

Depending on the degree of neutralization, the crosslinkers have different crosslinking activity, so that in each case, certain adaptations must be made. Thus, for example, a methacrylate ester of an alkoxylated methallyl alcohol has better reactivity at high degrees of neutralization than at low ones.

Some of the acrylate or methacrylate ester crosslinkers to be used according to the invention are commercially available, e.g., trimethylolpropane oxethylate triacrylate by the Cray Valley Company under the designation of Sartomer SR 415 (20EO), Craynor 435 (15EO), Sartomer RO 208 (9EO), Sartomer 454 (3EO), and pentaerythritol oxethylate tetraacrylate under the designation of Craynor SR 494 (5EO), and Servocure RTT 192 (5EO) by the Servo Delden BV Company, glycerol ethoxylate triacrylate (5.5EO) under the designation of Sartomer 921, and glycerol propoxylate triacrylate under the designation of Sartomer 9021 by the Cray Valley Company, and polyethylene glycol-400 diacrylate as Craynor SR 344, and polyethylene glycol-600 dimethacrylate as Craynor SR 252 by the Cray Valley Company.

It has been found that the crosslinker combination, in addition to a Group A crosslinker, must always include at least one additional crosslinker from the different crosslinker Groups B) and C).

A preferred crosslinker combination I) is composed of:
from 0.05 to 0.8 wt.-%, preferably from 0.2 to 0.6 wt.-% type A crosslinker;
from 0.05 to 1.4 wt.-%, preferably from 0.1 to 1.0 wt.-% type B crosslinker, and optionally
from 0 to 0.5 wt.-% type C crosslinker.

Another preferred crosslinker combination II) is composed of:
from 0.05 to 0,8, preferably from 0.3 to 0.8 wt.-% type A crosslinker,
from 0.05 to 1.5 wt.-%, preferably from 0.4 to 0.9 wt.-% type C crosslinker, and optionally
from 0 to 0.5 wt.-% type B crosslinker.

In each case, the mutual proportions of crosslinkers may be determined without great expense, using a few optimization tests. The total amount of crosslinker to be employed according to the invention ranges from 0.7 to 2.0 wt.-%, preferably from 0.9 to 1.5 wt.-%, relative to the monomers used.

The degree of neutralization of the acidic monomers during polymerization has great impact on the properties of the superabsorbers formed. High properties are obtained when from 15 to 80 mole-% and preferably, from 30 to 70 mole-%, and particularly preferred, from 40 to 70 mole-% of the acidic monomers are neutralized and, for example, are present as sodium, potassium or ammonium salts and/or mixtures thereof. The neutralization is carried out either by addition of alkali or ammonium hydroxides or by using the corresponding carbonates or hydrogen carbonates. In some cases it may be more favorable to employ the monomers in non-neutralized or low-neutralized condition prior to polymerization, and to perform the final neutralization only after the polymerization.

The maximum monomer concentration depends on the way in which the polymerization heat can be removed in the polymerization process employed. In the aqueous gel polymerization process, the monomer concentration may be up to 35 wt.-%; however, high product properties are achieved in the range of from 23 to 29 wt.-%.

As a basis for grafting, the polymerizates of the invention may contain water-soluble polymers in amounts of up to 30 wt.-%. Among others, these include partially or completely saponified polyvinyl alcohols, starch or starch derivatives, cellulose or cellulose derivatives, polyacrylic acids, polyglycols, or mixtures thereof. The molecular weights of the polymers added as grafting basis must be adapted to the aspects of the polymerization conditions. Thus, in the case of a polymerization in aqueous solution, for example, it may be necessary due to the viscosity of the polymerizate solution to employ only polymers of low or medium molecular weights, whereas this factor plays a minor role in suspension polymerization.

In addition to polymerizates to be obtained by crosslinking polymerization of partially neutralized acrylic acid, it is particularly preferred to use those containing additional fractions of graft-polymerized starch or of polyvinyl alcohol.

The addition of natural and/or synthetic fibers results in a more rapid absorption of liquid and an augmented retention of the superabsorber of the invention.

In principle, the preferred production of the superabsorbers to be used according to the invention is effected according to two methods:

According to the first method, the partially neutralized acrylic acid in aqueous solution and in the presence of the crosslinkers of the invention and optionally, additional crosslinkers, comonomers and graft polymers, is converted to a gel by free-radical polymerization, which then is crushed, dried, milled and optionally post-crosslinked, and optionally treated with conditioning agents, and screened to the desired particle size. The solution polymerization may be carried out continuously or batchwise. The patent literature presents a wide spectrum of possible variations with respect to concentration ratios, temperatures, type and amount of initiators as well as a variety of possible ways for post-crosslinking. Typical processes have been described in the following patent specifications which hereby are intended to be a constituent part of the production process according to the invention: U.S. Pat. No. 4,076,663; U.S. Pat. Nos. 4,286,082; DE 2,706,135; DE 3,503,458; DE 4,020,780; DE 4,244,548; DE 4,323,001; DE 4,333,056; DE 4,418,818.

The second method comprises the inverse suspension and emulsion polymerization processes. In these processes, an aqueous, partially neutralized acrylic acid solution is dispersed in a hydrophobic, organic solvent, using protective colloids and/or emulsifiers, and the polymerization is started using free-radical initiators. The crosslinkers either are dissolved in the monomer solution and metered together with same, or added separately and optionally, afterwards. The addition of optionally present graft basis polymers is effected via monomer solution or by directly placing in the oil phase. After the polymerization is completed, the water is removed azeotropically from the reaction mixture, and the polymer product is filtrated off.

Surface crosslinking of the polymer particles is normally used to increase the absorption of liquid under pressure. It may be effected both in the suspension and subsequently on the isolated polymer powder. The basic process is described in the patent specifications U.S. Pat. Nos. 4,340,706, DE 3,713,601, DE 2,840,010, for example, and is hereby intended to be considered as a constituent part of the production process according to the invention.

Advantageously, the post-crosslinkers are frequently added in the form of a solution in water, organic solvents or mixtures thereof, and especially where low quantities of post-crosslinker are used. Suitable mixing units for applying the post-crosslinking agent are, e.g., Patterson-Kelley mixers, DRAIS turbulence mixers, Lödige mixers, Ruberg mixers, screw mixers, pan mixers, and fluid-bed mixers, as well as continuously operated vertical mixers wherein the powder is mixed at a rapid frequency using rotating knives (Schugi mixer). After the post-crosslinker has been mixed with the pre-crosslinked polymer, heating is effected at temperatures of from 120 to 250° C., preferably from 135 to 200° C., and particularly preferred, from 150 to 185° C., in order to carry out the post-crosslinking reaction. The time period for additional heating is limited by that point where the desired properties pattern of the super-absorber is destroyed as a result of heat damage.

As a rule, suitable post-crosslinkers include at least two functional groups. Here, alcohol, amine, aldehyde glycidyl and epichloro functions are preferred and also, crosslinker molecules having multiple different functions are possible. Preferably, one of the following post-crosslinking agents is used: ethylene glycol, diethylene glycol, triethylene glycol, polyethylene glycol, glycerol, polyglycerol, propylene glycol, diethanolamine, triethanolamine, polypropylene oxide, block copolymers of ethylene oxide and propylene oxide, sorbitan fatty acid esters, ethoxylated sorbitan fatty acid esters, trimethylolpropane, ethoxylated trimethylolpropane, pentaerythritol, ethoxylated pentaerythritol, polyvinyl alcohol, sorbitol, ethylene carbonate, propylene carbonate, and polyepoxides such as ethylene glycol diglycidyl ethers. It is particularly preferred to work using ethylene carbonate as post-crosslinking agent. The post-crosslinking agent is used in amounts of from 0.01 to 30 weight percent, preferably 0.1–10 weight percent, and particularly preferred, 0.1–1 weight percent relative to the polymer to be post-crosslinked.

Frequently, the superabsorbers to be used according to the invention are added with common conditioning agents familiar to a person skilled in the art, in order to prevent static charging or unintended agglomeration, for example. To this end, e.g., stearates and polyalkylene glycols are used.

The superabsorbent polymers to be used according to the invention are preferably present within a particle size range of from 10 to 1,000 $\mu$m, and particularly preferred, between 100 and 850 $\mu$m. The particles are dispersed within the insert, swelling to a gel when absorbing liquid. In addition to the preferred homogeneous dispersion of the particles, it may be advantageous in many cases, for improved absorption or absorption rate, to build up a concentration gradient and/or a particle size gradient of the absorbers inside the core. The ratio of superabsorbent polymer is from 30 to 150 wt.-%, preferably from 50 to 100 wt.-% relative to the weight of the fibers. In a preferred embodiment, it was found sufficient to use from 30 to 50 g/m$^2$ of the superabsorbent polymer of the invention in a fiber matrix of from 60 to 90 g/m$^2$ in order to absorb liquid exudates from foodstuffs.

The exterior envelope of the insert consists of a bottom and a top perforated film and/or a fleece made of plastic, through which liquid may permeate into the absorbent core. It is quite possible to perforate only one side of the envelope, but, due to the extremely low migration values of the absorbent substrates of the invention, it is advantageously possible to perforate the envelope on the foodstuff side as well, which is advantageously possible, since virtually no migrated materials can reach the foodstuff. Frequently, it is also advantageous to design the perforation density of top and bottom sides in different fashion, in order to improve the absorption. For example, polyethylene, polypropylene, polyamide, polyester and polyvinyl chloride having weights per unit area of from 12 to 25 g/m², preferably from 15 to 20 g/m² are used as plastics. Top and bottom films are preferably bound to each other at their edges. To this end, the edges of the enveloping materials are welded together under temperature and pressure, for example, or frequently as well, glued together using hot-melt adhesives. In various cases, mechanical binding is also possible, e.g., by sewing the edges of the envelopes. Occasionally, adhesive and/or welded and mechanical binding are combined. Indeed, it is ensured in any case that the powders of the superabsorbent polymers cannot escape the envelope and reach the foodstuffs.

Optionally, absorbent substrates may be put to use for special packaging units where the absorbent core merely consists of the superabsorbent polymer and does not include any additional interior fibrous materials.

Similarly, when the absorbent substrates are used as a substitute for ice, they preferably consist only of the enveloping film or fleece and the superabsorbers to be used according to the invention. After swelling with water, the substrates are frozen and used instead of ice for refrigerating foodstuffs. In contrast to refrigerating using ice, there is no thawed water in this case.

Among the numerous possible forms of inserts, rectangular or quadratic ones are preferred; however, other forms, such as round ones are also used for special packaging containers. Frequently, it is advantageous to modify the insert in such a way that instead of a continuous uniform structure, a honeycomb type structure is produced, wherein basically, many individual absorbent pads are present, neighboring each other. Such honeycomb subdivision shows to advantage particularly in those cases where an absorbent substrate as absorbing component, having relatively large surface, is filled with superabsorber only, i.e., without fiber or fleece components, because in this way, persistently good distribution of the absorber over the surface is ensured.

TESTING METHODS

Retention TB (Superabsorber)

The retention is determined according to the tea bag method, wherein 200 mg of test substance is welded in a tea bag, immersed in a 0.9% NaCl solution for 30 minutes, drained for 10 minutes, centrifuged in a centrifuge (23 cm in diameter, 1,400 rpm) for 5 minutes and weighed. A tea bag having no water-absorbing polymerizate is run as a so-called blank:

TB=(final weight−blank)/initial weight (g/g)

Absorption Against Pressure AAP (Superabsorber)

The ability of a water-absorbing polymerizate to absorb liquid from a reservoir under a defined pressure (Absorption Against Pressure (0.3 psi=21 g/cm²), APP (0.7 psi=49 g/cm²)) is determined as follows: 900 mg of test substance is weighed in a plastic cylinder (inner diameter=6 cm, height=5 cm) having a screen fabric (mesh width=400 mesh) as bottom, dispersed uniformly, and weighted using a defined weight in the form of a plastic plate (diameter=5.98 cm), together with a metal piston (diameter=5.98 cm). The plastic plate is situated between the test substance and the metal piston. Thereafter, the entire testing unit is placed on a glass filter plate (diameter=12 cm, porosity=0) which is covered with a filter paper and soaked with 0.9% NaCl solution. The filter plate is embedded in the NaCl solution up to its top edge. The test substance is allowed to absorb liquid for 60 minutes:

AAP(0.3 or 0.7 psi)=(weight of the testing unit prior to absorption−weight of the testing unit after absorption)/initial weight of test substance (g/g)

Solubles LA (Superabsorber)

100 g of a 0.9% saline solution is placed in a 250 ml Erlenmeyer flask and stirred at 500 rpm using a magnetic stirrer. 0.2 g of superabsorber is weighed in. After complete addition, stirring is effected for 16 hours, with the piston closed. Subsequently, filtration is effected over a glass microfilter. The filtrated solution is adjusted to a pH value of about 10.0, using sodium hydroxide solution. Thereafter, titration is effected to a pH value below 3.0, using 0.1 N hydrochloric acid. A titration curve having two inflection points is obtained. The first equivalence point corresponds to excess sodium hydroxide at pH 8.0 to 8.4, and the second equivalence point corresponds to displaced acrylic acid at pH 4.0 to 4.3. The difference in the quantity of hydrochloric acid between the inflection points indicates the total amount of acrylates and thus, the water-soluble ratio of the superabsorber. Calculation:

$$\% \text{ Solubles } (LA) = \frac{(V2 - V1) \times C \times \text{Equivalent weight}^* \times 100.2}{EW \times 10 \times VF}$$

$V2$ = HCl consumption to reach the 2nd inflection point [ml]
$V1$ = HCl consumption to reach the 1st inflection point [ml]
$C$ = HCl normality [moles/1000 ml]
$EW$ = Initial weight of superabsorber [g]
$VF$ = Amount of filtrate [g]
(*) = Equivalent weight calculated from the degree of superabsorber neutralization

Rate of Liquid Absorption (SG)

In this test, the time period is measured, in which 1 g of superabsorber absorbs 20 g of a 0.2% saline solution at room temperature. This test procedure is described in EP 443,627, page 12, "Free-Swell-Rate".

Residual Monomers (Superabsorber)

The residual monomers (RM) are determined from the filtrate of the solubles determination using the HPLC method and evaluated according to the internal standard method.

Migration Measurement (Absorbent Substrate)

The absorbent substrate in a 250 ml screw cap jar is perfused with a test liquid and stored therein without agitation for 10 days at room temperature.

The test liquid may consist of distilled water, 0.2% or 0.9% saline solution and is employed in excess relative to the absorptive capacity of the absorbent substrate. The excess is to simulate that case where the substrate is exposed to an amount of liquid higher than prescribed.

Subsequently, the test liquid not absorbed by the absorbent pad is sucked off over a 45 µm filter and examined for the fractions migrated from the absorbent substrate. If distilled water is used as test liquid, the migrated fractions are obtained from the dry residue of the sucked-off aqueous phase. In contrast, if 0.2% or 0.9% aqueous salt solutions are used as test liquids, the sodium chloride content must be subtracted from the dry residue to obtain the migration value. The results are expressed as mg of migrated material per dm² or per g of absorbent substrate.

Measurement of Microbial Contamination

A Petri dish is charged with the respective absorbent pad and a nutrient broth. The amount of nutrient broth is proportioned in such fashion as to be completely absorbed by the absorbent pad. Subsequently, cultivation is effected in an incubator at 30° C. for 48 hours. To visualize microbial growth, the broth is added with triphenyltetrazolium chloride (TTC; 2 drops of a 1% TTC solution/9 ml of broth). TTC is reduced by microbial activity from a colorless solution to an intensively reddish coloration and thus, may be used as a qualitative measure for microbial activity.

For the quantitative determination of microbial activity using 1% TTC solution, tea bags with and without superabsorber are incubated with blood and tissue water (thawed water) of a purchased, commercially available boiling fowl (deep-frozen). The tea bag is subsequently subjected to measurement using a thin-layer scanner (Desaga CA 60 thin-layer scanner) at λ=435 nm and compared to a white silica gel TLC plate. The typical thawed water contains about $10^4$ germs/ml. The obtained relative peak heights are correlated and used as a measure for microbial activity with respect to germ count increase (intensity of red coloration) as well as areal propagation (size of red-colored area).

The following examples demonstrate the design of some absorbent substrates of the invention, the advantageously low migration values in water and aqueous solutions, and the antimicrobial activity. Furthermore, the production of the superabsorbers to be used advantageously in these absorbent substrates, using the special combinations of crosslinkers will be described, and the favorable combination of properties, comprising retention, absorption against pressure, and solubles will be illustrated.

EXAMPLE 1

An absorbent insert having the following design was produced:

A: Top and bottom sealing films made of a perforated polyethylene film having 16 g/m²; manufactured by Paramount Packaging, USA;

B: Polypropylene fibers 3d, 64 mm fiber length, 79 g/m², type 123 by the Company HERCULES INC., Wilmington, USA;

C: Superabsorbent polymer according to Example 5, 43 g/m², uniformly spread into the B-layer between the polypropylene fibers.

The core of the insert of B+C has the dimensions 76×127 mm, the insert itself measures 89×140 mm and is sealed at its edges by a welding seam.

EXAMPLE 2

Following the procedure of Example 1, an absorbent insert was produced:

A: Top and bottom fleeces made of polypropylene, 17 g/m², manufactured by the SCOTT PAPER Company, polypropylene fibers by the Company HERCULES INC., Wilmington, USA;

B: Films of perforated polyethylene having 16 g/m², each one above and below the C-layer;

C: Polypropylene fibers 3d, 64 mm fiber length, 68 g/m², type 123 by the Company HERCULES INC., Wilmington, USA;

D: Superabsorbent polymer according to Example 4, 42 g/m², uniformly spread into the polypropylene fibers of layer C.

The core of the insert of B+C+D has the dimensions 76×127 mm, the insert itself measures 89×140 mm and is sealed at its edge.

EXAMPLE 3

An absorbent insert was produced on a production machine at a rate of about 5.5 to 6.5 m/min; the design is as follows:

A: Top and bottom fleeces of polyethylene terephthalate, 17 g/m²

B: Fibers of polyethylene terephthalate, 65 g/m²

C: Superabsorbent polymer according to Example 7, 50 g/m², uniformly spread into the B fiber layer.

The individual layers were mechanically bound to each other by needle punching.

EXAMPLES 4–13

Superabsorbent polymers to be used according to the invention were polymerized according to the following guideline formulation:

In a cylindrical plastic vessel, a polymerization batch of 1000 g in total is prepared. To this end, 280 g of acrylic acid for batches with 28% WS (active substance) and 240 g of acrylic acid for batches with 24% WS, respectively, and the employed crosslinkers, comonomers and other components are mixed in completely desalted water. With stirring and cooling, partial neutralization is effected to the degree of neutralization (NG) indicated in Table 1, using 50% sodium hydroxide solution. The solution cooled to 7–8° C. and purged with nitrogen until the oxygen content in the monomer solution has dropped to a value of below 0.2 ppm. Subsequently, 100 ppm of azobis(2-amidinopropane) dihydrochloride, dissolved in 10 g of salted water, 800 ppm of sodium persulfate, dissolved in 6 g of VE-water (desalted water), 70 ppm of hydrogen peroxide (35%), dissolved in 1 g of VE-water (desalted water), are added. Then, the polymerization is initiated by adding 9 ppm of ascorbic acid, dissolved in 2 g of water, which results in a significant temperature rise. Once polymerization is completed, the gel-like polymer block is crushed, willowed and dried. Thereafter, the polymer is milled and screened for the grain fraction of 150–800 μm.

TABLE 1

| Ex. | WS | NG | TAA | TMPTA | TMP3EO TA | PE5EO TA | PEG400 DA | AA10EO MA | TB [g/g] | AAP 0.3 [g/g] | LA | $Q_{SAP\,0.3}$ | SG [s] | RM [ppm] |
|---|---|---|---|---|---|---|---|---|---|---|---|---|---|---|
| B4 | 28 | 80 | 0.35 | | | | | 0.7 | 28.5 | 19.0 | 1.8 | 26.4 | | |
| B5 | 28 | 70 | 0.35 | 0.7 | 28.5 | 17.3 | 1 | 45.8 | 28 | | | | | |
| B6 | 28 | 75 | 0.45 | 0.7 | 26.5 | 21 | 1 | 47.5 | 32 | | | | | |
| B7 | 28 | 55 | 0.3 | 0.4 | 25.5 | 24.0 | 2.2 | 22.5 | 450 | | | | | |
| B8 | 24 | 50 | 0.3 | 0.8 | 22.9 | 19.2 | 1.4 | 30.1 | 230 | | | | | |

TABLE 1-continued

| Ex. | WS | NG | TAA | TMPTA | TMP3EO TA | PE5EO TA | PEG400 DA | AA10EO MA | TB [g/g] | AAP 0.3 [g/g] | LA | $Q_{SAP\,0.3}$ | SG [s] | RM [ppm] |
|---|---|---|---|---|---|---|---|---|---|---|---|---|---|---|
| B9  | 28 | 40 | 0.3 | 0.4  | 23.6 | 19.3 | 1.9 | 22.6 | 300 | | | | | |
| B10 | 28 | 40 | 0.3 | 0.6  | 25.1 | 19.1 | 1.9 | 23.3 | 470 | | | | | |
| B11 | 28 | 55 | 0.3 | 0.5  | 26.2 | 22.3 | 2   | 24.2 |     | | | | | |
| B12 | 28 | 50 | 0.3 | 0.15 |      |      |     | 0.6  | 26.6 | 20.2 | 1.9 | 24.6 | 33 | 490 |
| B13 | 24 | 40 | 0.3 | 0.8  | 20.0 | 19.1 | 1.9 | 20.6 | 210 | | | | | |

TAA: triallylamine, TMPTA: trimethylolpropane triacrylate, TMP3EOTA: trimethylolpropane(3EO) triacrylate, PE3EOTA: pentaerythritol(3EO) tetraacrylate, PE5EOTA: pentaerythritol(5EO) tetraacrylate, PEG400DA: polyethylene glycol(400) diacrylate, AA10EOMA: allyl alcohol(10EO) methacrylate. The figures referring to the crosslinkers indicate wt.-% / acrylic acid.

COMPARATIVE EXAMPLES 1–6

According to the formula of Example, polymerizates having 28% AS were produced using the crosslinkers indicated in Table 2. V1 contains only 300 mg of sodium peroxodisulfate and, in addition, 0.4 wt.-% sodium carbonate. V2 contains no hydrogen peroxide. V3 was prepared using 600 mg of sodium peroxodisulfate. The results demonstrate that superabsorbers, in which the employed amounts of crosslinkers fall outside the limits of the invention or outside the compositions of the invention do not have the required $Q_{SAP\,0.3}$ values.

The polymerizate is poorly crosslinked and has an exceptionally high solubles ratio of 74 wt.-%, which is unacceptable for use in absorbent substrates for foodstuffs.

EXAMPLE 14

The superabsorber of the invention of Example 5 is subjected to a post-crosslinking reaction, thereby significantly improving the properties of the absorber in liquid absorption under pressure, especially under high pressure (AAP 0.7).

100 g of the polymer screened to 150 to 800 μm is mixed with a solution of 0.5 g of ethylene carbonate, 2 g of desalted

TABLE 2

| Batch | NG [mole-%] | TAA [wt.-%] | TMP3EOTA [wt.-%] | PEG600DA [wt.-%] | AA-10EO-MA [wt.-%] | TB [g/g] | AAP 0.3 [g/g] | LA [wt.-%] | $Q_{SAP\,0.3}$ | SG [s] | RM [ppm] |
|---|---|---|---|---|---|---|---|---|---|---|---|
| V1 | 70 |      |                  | 0.1  | 0.2 | 44.6 | 7.5 | 11.1 | 4.7 | | 500 |
| V2 | 55 | 0.6  | 25.1             | 20.5 | 3.3 | 13.8 | 45  | 200  |     | | |
| V3 | 40 | 0.25 | 0.3              | 30   | 8.5 | 6.5  | 5.9 | 42   | 210 | | |
| V4 | 30 | 0.2  | 0.3              | 26   | 9.8 | 6.1  | 5.8 | 48   | 155 | | |
| V5 | 55 | 1.25 | 26               | 19.7 | 3.4 | 13.4 | 700 |      |     | | |
| V6 | 55 | 1.0  | 25.2 (PE5EOTA)   | 24.9 | 3.0 | 16.7 | 790 |      |     | | |

TAA: triallylamine, TMP3EOTA: trimethylolpropane(3EO) triacrylate, PEG600DA: polyethylene glycol(600) diacrylate, AA-10EO-MA: methacylate ester of an allyl alcohol etherified with 10 moles of EO; PE5EOTA: pentaerythritol(5EO) tetraacrylate.

COMPARATIVE EXAMPLE 7

In this example, a superabsorber is crosslinked using an amount of N,N'-methylenebisacrylamide as employed in the embodiments U.S. Pat. No. 4,677,174. Such sparingly crosslinked absorbers are described in EP 562,846 A1 for use in absorbent substrates for foodstuffs.

Following the procedure of Example 4 according to the invention, 280 g of acrylic acid is 90% neutralized with equimolar quantities of sodium hydroxide solution and ammonium hydroxide and polymerized using 26.5 mg of N,N'-methylenebisacrylamide (0.009 wt.-% based on acrylic acid) as crosslinking component.

water and 4 g of acetone with vigorous intermixing and subsequently, heated in an oven at a temperature of 180° C. for 25 minutes. Table 3 illustrates the properties of the superabsorber before and after post-crosslinking. The improvement of the $Q_{SAP}$ quotient for the post-crosslinked superabsorber is evident. Absorbent substrates filled with such superabsorbers are particularly suited for safe packaging of heavy foodstuffs.

TABLE 3

| Absorber from | | TB [g/g] | | AAP 0.3 [g/g] | | AAP 0.7 [g/g] | | LA [wt. %] | | $Q_{SAP\,0.3}$ | | $Q_{SAP\,0.7}$ | |
|---|---|---|---|---|---|---|---|---|---|---|---|---|---|
| Example | Example | before | after | before | after | before | after | before | after | before | after | before | after |
| 14 | 5 | 8.5 | 26.4 | 17.3 | 28.9 | 7.7 | 23.5 | 1 | 1.2 | 45.8 | 46.1 | 36.2 | 41.5 |

EXAMPLE 15

Following the polymerization procedure of Examples 4–13, a superabsorber to be used according to the invention is produced, with the proviso that at a AS of 28 wt.-% and a neutralization degree of 40%, 0.3 wt.-% triallylamine and 0.5 wt.-% PE5EOTA are used and subsequently, the resulting polymer is post-crosslinked according to Example 14 using ethylene carbonate. The properties are as follows: TB=21.8 g/g, AAP 0.3=24.7 g/g, AAP 0.7=20.5 g/g, LA=1.9 wt.-%, $Q_{SAP\ 0.3}$=24.5, $Q_{SAP\ 0.7}$=22.3.

EXAMPLE 16

Following the polymerization procedure of Examples 4–13, a superabsorber to be used according to the invention is produced at a AS of 28 wt.-% and a neutralization degree of 55%, with the proviso that 5 wt.-% acrylic acid is replaced with acrylamidopropanesulfonic acid. Subsequently, the absorber is post-crosslinked according to the experimental specificatons of Example 14, using ethylene carbonate. The absorber has the following properties: TB=23 g/g, AAP 0.3=25 g/g, AAP 0.7=20.5 g/g, LA=1.5 wt.-%, $Q_{SAP\ 0.3}$=32, $Q_{SAP\ 0.7}$=29.

EXAMPLE 17

Following the polymerization procedure of Examples 4–13, a superabsorber to be used according to the invention is produced at a AS of 28 wt.-% and a neutralization degree of 55%, with the proviso that in addition, 1 wt.-% of partially saponified polyvinyl alcohol, type Mowiol 5/88 (Hoechst AG Company, Germany), is present as a grafting basis in the monomer mixture to be polymerized. Subsequently, the absorber is post-crosslinked according to the experimental specifications of Example 14, using ethylene carbonate. The absorber has the following properties: TB=24.4 g/g, AAP 0.3=26 g/g, AAP 0.7=22 g/g, LA=1.7 wt.-%, $Q_{SAP\ 0.3}$=29.6, $Q_{SAP\ 0.7}$=27.3.

COMPARATIVE EXAMPLES 8–11

The properties of commercially available superabsorbers offered for use in absorbent substrates for food-stuffs, were determined. The data are presented in Table 4.

TABLE 4

| Comparison | Absorber | TB [g/g] | AAP 0.3 [g/g] | LA [wt.-%] | $Q_{SAP\ 0.3}$ | SG [s] |
|---|---|---|---|---|---|---|
| V8 | Sanwet IM 1000 #1 | 49.0 | 7.0 | 5.2 | 10.8 | 31 |
| V9 | Sanwet IM 3900 #2 | 33.5 | 13.0 | 5.1 | 9.1 | 32 |
| V10 | Sanwet IM 5000S #3 | 31.0 | 20.0 | 6.6 | 7.7 | |
| V11 | Salsorb 90P #4 | 26.5 | 24.0 | 8.1 | 5.9 | 22 |

1–#3: Superabsorbers made of starch/polyacrylate by the Company Hoechst AG;
4: Superabsorber made of crosslinked polyacrylate by the Company Allied Colloids Ltd.

The examined superabsorbers for commercially available absorbent substrates do not meet the requirements according to the invention with respect to the $Q_{SAP\ 0.3}$ quotient.

EXAMPLE 18

Absorbent substrates having a total weight of 0.59 g and consisting of tea bags (100 mm×100 mm=1 dm$^2$) having a filling of 0.2 g of superabsorber of Example 6 and Comparative Example 1, respectively, are produced and examined in distilled water and in 0.2% saline solution according to the method for determining the migration. The results in Table 5 demonstrate that only the absorbent substrate of the invention, having a superabsorber of Example 6 with $Q_{SAP\ 0.3}$=47.5 meets the low migration values of $\leq$15 mg/g absorbent substrate required according to the invention. The absorbent substrate with the absorber of Comparative Example V1, having a $Q_{SAP\ 0.3}$=4.7, shows unsatisfactorily high migration values.

TABLE 5

| Superabsorber from Example | Excess of test liquid | Migration value [mg/dm$^2$ or mg/g absorbent substrate] | Excess of test liquid | Migration value [mg/dm$^2$ or mg/g absorbent substrate] | Excess if test liquid | Migration value [mg/dm$^2$ or mg/g absorbent substrate] | Excess of test liquid | Migration value [mg/dm$^2$ or mg/g absorbent substrate] |
|---|---|---|---|---|---|---|---|---|
| B6 | 50 ml of distilled water | 4.5 or 7.6 | 100 ml of distilled water | 5.7 or 9.6 | 50 ml of 0.2% NaCl soln. | 2.2 or 3.7 | 100 ml of 0.2% NaCl soln. | 4.1 or 6.9 |
| V1 | 50 ml of distilled water | 11.3 or 19.2 | 100 ml of distilled water | 14.9 or 25.2 | 50 ml of 0.2% NaCl soln. | 18.2 or 30.8 | 100 ml of 0.2% NaCl soln. | 20.0 or 33.9 |

EXAMPLE 19

Absorbent substrates having a total weight of 0.59 g and consisting of tea bags (100 mm×100 mm=1 dm$^2$) having a filling of 0.2 g of superabsorber of Example 6 and Comparative Example 1, respectively, are produced and examined in 80 ml of 0.9% saline solution according to the method for determining the migration. The results demonstrate the superiority of the absorbent substrates of the invention with respect to lowest migration values.

TABLE 6

| Superabsorber of Example | Amount of test liquid | Migration value [mg/dm$^2$ or mg/g absorbent substrate] |
|---|---|---|
| B6 | 80 ml of 0.9% NaCl soln. | 9.1 or 15.0 |
| V1 | 80 ml of 0.9% NaCl soln. | 20.2 or 34.2 |

COMPARATIVE EXAMPLE 12

Commercially available absorbent substrates for food-stuffs were examined for their migration properties in 0.2 and 0.9% saline solutions. The products, when compared to those of the invention, have a significantly higher migration.

Measurement in distilled water was not possible because the absorbent substrates were caused to burst by the absorber particles.

TABLE 7a

| Commercial product | Excess of test liquid | Migration value [mg/dm² or mg/g absorbent substrate] |
|---|---|---|
| THERMAFREEZE# | 50 ml of 0.9% NaCl soln. | 58.2 or 21.3 |
| | 100 ml of 0.9% NaCl soln. | 80.6 or 29.5 |
| Sorba-Freeze Pads## | 50 ml of 0.9% NaCl soln. | 142.7 or 34.9 |
| | 100 ml of 0.9% NaCl soln. | 183.5 or 44.9 |

Commercial product of the Company Therma Rite, Australia/Denmark
Commercial product of the Company Sorba-Freeze Ltd., Scotland TABLE 7b

| Commercial product | Excess of test liquid | Migration value [mg/dm² or mg/g absorbent substrate] |
|---|---|---|
| THERMAFREEZE# | 50 ml of 0.2% NaCl soln. | 51.8 or 19.0 |
| | 100 ml of 0.2% NaCl soln. | 61.2 or 22.4 |
| Sorba-Freeze Pads## | 50 ml of 0.2% NaCl soln. | 127.7 or 31.2 |
| | 100 ml of 0.2% NaCl soln. | 146.4 or 36.9 |

COMPARATIVE EXAMPLE 13

The Superabsorber contained in the THERMAFREEZE absorbent substrate is isolated, and its properties are determined. TB=24.5 g/g, AAP 0.3=19.5 g/g, LA=2.4 wt.-%, $Q_{SAP,0.3}$=18.3. With respect to the requirements according to the invention, the migration values are clearly above the limit of 15 mg/g, and the $Q_{SAP\ 0.3}$ of the employed superabsorber is below the limit of 20.

COMPARATIVE EXAMPLE 14

In a sterile Petri dish, a non-sterile paper plate (commercially available as foodstuff base) is soaked with 18 ml of sterile Caso broth and incubated for 48 hours at 30° C. Result: bacteria grow on the paper plate, recognizable by the mucus formation and the intensive odor of bacterial decomposing activity.

COMPARATIVE EXAMPLE 15

In a sterile Petri dish, 18 ml of sterile Caso broth is incubated for 48 hours at 30° C. Result: neither bacteria nor fungi are detectable in the broth.

COMPARATIVE EXAMPLE 16

In a non-sterile Petri dish, 18 ml of sterile Caso broth is incubated for 48 hours at 30° C. Result: bacteria and molds grow in the broth, recognizable by the turbidity of the broth and the intensive odor of bacterial decomposing activity.

EXAMPLE 20

Tea bags without and with superabsorber of Example 5 (0.5 g/dm²) were placed in a Petri dish 20 cm in diameter and subjected to conditions according to those indicated in the following Table under "Incubation". The incubation itself was effected for 24 hours in an incubator at 37° C. There was no additional contamination by germs. As already illustrated in the chapter on testing methods, the measurement of microbial activity was performed using a thin-layer chromatographic procedure where the specification of the relative peak heights correlates with the germ count. It is apparent that the use of the polymer of the invention is originally responsible for the rapid decrease of microbial activity:

TABLE 8

| Test | Incubation | Relative peak height |
|---|---|---|
| A | Tea bags without polymer Addition of 5 ml of thawed water and addition of 2 drops of TTC solution | 5626 |
| B | Tea bags with polymer Addition of 5 ml of thawed water and addition of 2 drops of TTC solution | 745 |
| C | As in B, but without incubation in the incubator; instead, immediate measurement. | 728 |

EXAMPLE 21

In a sterile Petri dish, a non-sterile cellulose fleece containing superabsorber (Example 6, 0.5 g/dm²) is soaked with 18 ml of sterile casein soya meal peptone broth (Caso broth), to which 4 drops of a 1% TTC solution have been added, and incubated for 48 hours at 30° C. Result: only two red bacteria colonies are recognizable on the fleece. No change in odor due to bacterial decomposing activity is perceptible.

A comparative test using absorber-free cellulose fleece shows bacterial growth which can be recognized by an intensive red coloration of the entire fleece and an intensive odor caused by bacterial metabolic activity.

What is claimed is:

1. An absorbent insert for packagings, comprising a top and a bottom covering layer and a core which absorbs aqueous liquids and includes absorbent polymers, wherein the absorbent polymers have been obtained from partially neutralized ethylenically unsaturated monomers containing acid groups, optionally other monomers copolymerizable therewith, and optionally polymers suitable as graft basis, and a crosslinker combination comprising a type A crosslinker with at least one additional type B or type C crosslinker, wherein the type A crosslinker consists of di- and/or tri-allylamine, the type B crosslinker consists of (meth)acrylate esters of polyols, and the type C crosslinker consists of (meth)acrylate esters of alkoxylated (meth)allyl alcohols.

2. The absorbent insert of claim 1, wherein the top and bottom covering layers consist of plastic or cellulose films or fabrics or fleeces, and that at least part of the covering layer film is permeable to water or aqueous liquids as a result of perforations.

3. The absorbent insert according to claim 1, wherein the absorbent core consists of a fleece or fabric wherein the polymers absorbing aqueous liquids are dispersed and optionally fixed.

4. The absorbent insert according to claim 1, wherein the monomers having unsaturated acid groups are selected from the group consisting of acrylic acid, methacrylic acid, vinylacetic acid, maleic acid, vinyl sulfonic acid, (meth)allylsulfonic acid, 2-acrylamido2-methylpropanesulfonic acid and mixture thereof.

5. The absorbent insert according to one of claim 1, wherein the absorbent polymer contains polymerized therein from 0 to 40 wt.-% of other comonomers selected from the group consisting of vinylpyrrolidone, hydroxyethyl acrylate, alkylaminoalkyl(meth)acrylates, and mixtures thereof vinylacetamide.

6. The absorbent insert according to claim 1, wherein the absorbent polymer contains up to 30 wt.-% of water-soluble polymers as graft basis.

7. The absorbent insert according to claim 1, wherein the crosslinker combination consists of (I) from 0.05 to 0.8 wt.-% of the type A crosslinker, from 0.05 to 1.4 wt.-% of the type B crosslinker, and optionally from 0 to 0.5 wt.-% of the type C crosslinker, or (II) from 0.05 to 0.8 wt.-% of the type A crosslinker, from 0.05 to 1.5 wt.-% of the type C crosslinker, and optionally from 0 to 0.5 wt.-% of the type B crosslinker, with the proviso that the overall concentration of the crosslinkers is from 0.7 to 2.0 wt.-%, relative to the monomers employed.

8. The absorbent insert according to claim 1, wherein the absorbent polymers have been produced using a mixture of crosslinkers containing diallylamine and/or triallylamine as the type A crosslinker, trimethylolpropane oxethylate (meth)acrylate and/or glycerol oxethylate (meth)acrylate and/or pentaerythritol oxethylate (meth)acrylate and/or polyethylene glycol α,ω-di(meth)acrylate as the type B crosslinker, and (meth)allylpolyethylene glycol (meth)acrylate as the type C crosslinker, with the proviso that in addition to type A, at least one of the type B or C crosslinker has been used in the combination of crosslinkers.

9. The absorbent insert according to claim 1, wherein the absorbent polymer has been post-crosslinked at its surface using a post-crosslinker, and said post-crosslinking has optionally been repeated several times.

10. The absorbent insert according to claim 9, wherein the absorbent polymer has been crosslinked at its surface using a post-crosslinker selected from the group consisting of polyols, polyepoxides, polyamines, and alkylene carbonates.

11. The absorbent insert according to claim 1, wherein the absorbent polymers have a retention of at least 22 g/g.

12. The absorbent insert according to claim 1, wherein the absorbent polymers have an absorption against pressure (AAP 0.3) of at least 15 g/g.

13. The absorbent insert according to claim 1, wherein the absorbent polymers have a solubles ratio of 3.5 at maximum.

14. The absorbent insert according to claim 1, wherein the migration values of the absorbent polymer do not exceed 15 mg/g of absorbent insert.

15. The absorbent insert according to claim 1, wherein the absorbent polymers have a $Q_{SAP\ 0.3}$ of at least 30.

16. The absorbent insert according to claim 1, wherein the absorbent polymers have a $Q_{SAP\ 0.3}$ of at least 40.

17. A process for the production of an absorbent insert comprising a top and a bottom covering layer and a core which absorbs aqueous liquids and includes absorbent polymers, comprising polymerizing partially neutralized monomers bearing monoethylenically unsaturated acid groups, optionally other monomers copolymerizable therewith, and optionally polymers suitable as graft basis, with a crosslinker combination comprising a type A crosslinker with at least one additional type B or type C crosslinker, the type A crosslinker being constituted of di- and/or triallylamine, the type B crosslinker being constituted of (meth)acrylate esters of polyols, and the type C crosslinker being constituted of (meth)acrylate esters of alkoxylated (meth)allyl alcohols.

18. The process for the production of an absorbent insert according to claim 17, wherein the absorbent polymers have been produced using a crosslinker combination consisting of (I) from 0.05 to 0.8 wt.-% of the type A crosslinker, from 0.05 to 1.4 wt.-% of the type B crosslinker, and optionally from 0 to 0.5 wt.-% of the type C crosslinker, or (II) from 0.05 to 0.8 wt.-% of the type A crosslinker, from 0.05 to 1.5 wt.-% of the type C crosslinker, and optionally from 0 to 0.5 wt.-% of the type B crosslinker, with the proviso that the overall concentration of the crosslinkers is from 0.7 to 2.0 wt.-%, relative to the monomers employed.

19. The process for the production of an absorbent insert according to claim 17, wherein the absorbent polymers have a $Q_{SAP\ 0.3}$ of at least 30.

20. The process for the production of an absorbent insert according to claim 17, wherein the absorbent polymers have a $Q_{SAP\ 0.3}$ of at least 40.

21. A method of packaging foodstuffs, comprising packaging a foodstuff in a package containing the absorbent insert of claim 1.

22. A method of making an ice substitute suitable for packaging applications, comprising:

providing an absorbent insert comprising a top and a bottom covering layer and a core which absorbs aqueous liquids and includes absorbent polymers, wherein the absorbent polymers have been obtained from partially neutralized ethylenically unsaturated monomers containing acid groups, optionally other monomers copolymerizable therewith, and optionally polymers suitable as graft basis, and a crosslinker combination comprising a type A crosslinker with at least one additional type B or type C crosslinker, wherein the type A crosslinker consists of di- and/or tri-allylamine, the type B crosslinker consists of (meth)acrylate esters of polyols, and the type C crosslinker consists of (meth)acrylate esters of alkoxylated (meth)allyl alcohols; and soaking said absorbent insert in water and freezing the insert.

* * * * *

UNITED STATES PATENT AND TRADEMARK OFFICE
CERTIFICATE OF CORRECTION

PATENT NO.   : 6,350,710 B1
DATED        : February 26, 2002
INVENTOR(S)  : Gerd Jonas et al.

It is certified that error appears in the above-identified patent and that said Letters Patent is hereby corrected as shown below:

Column 21,
Lines 5 and 6, "alkylaminoalkyl(meth)acrylates, and mixtures thereof vinylacetamide." should read -- alkylaminoalkyl(meth)acrylates, vinylacetamide and mixtures thereof.

Signed and Sealed this

Fourth Day of June, 2002

Attest:

JAMES E. ROGAN
Attesting Officer      Director of the United States Patent and Trademark Office